March 20, 1951  L. A. WARNER  2,545,935
NAVIGATIONAL INSTRUMENT
Filed Aug. 19, 1947  4 Sheets-Sheet 1

INVENTOR.
L. A. WARNER

March 20, 1951  L. A. WARNER  2,545,935
NAVIGATIONAL INSTRUMENT
Filed Aug. 19, 1947  4 Sheets-Sheet 2
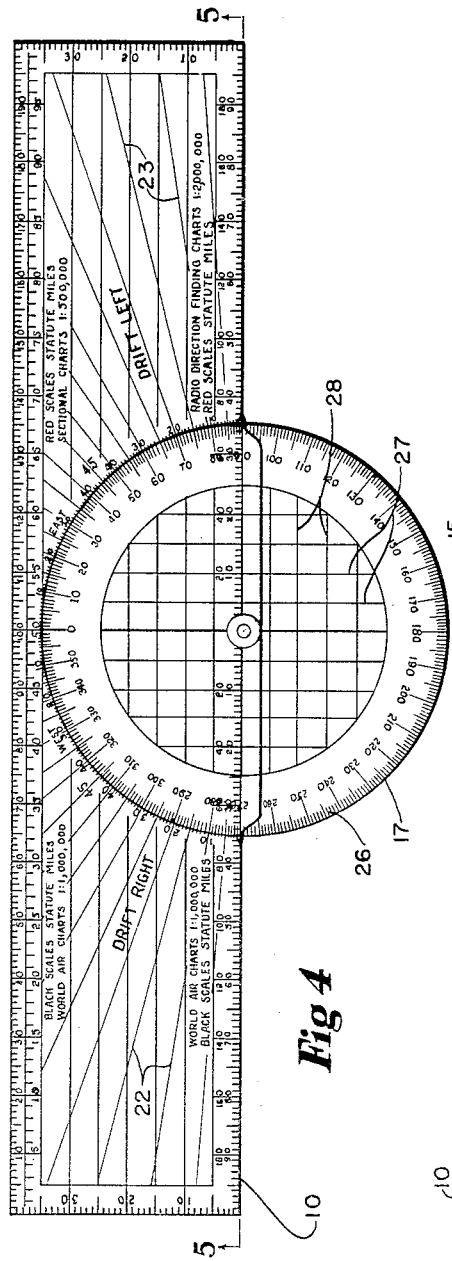
Fig 4
Fig 5
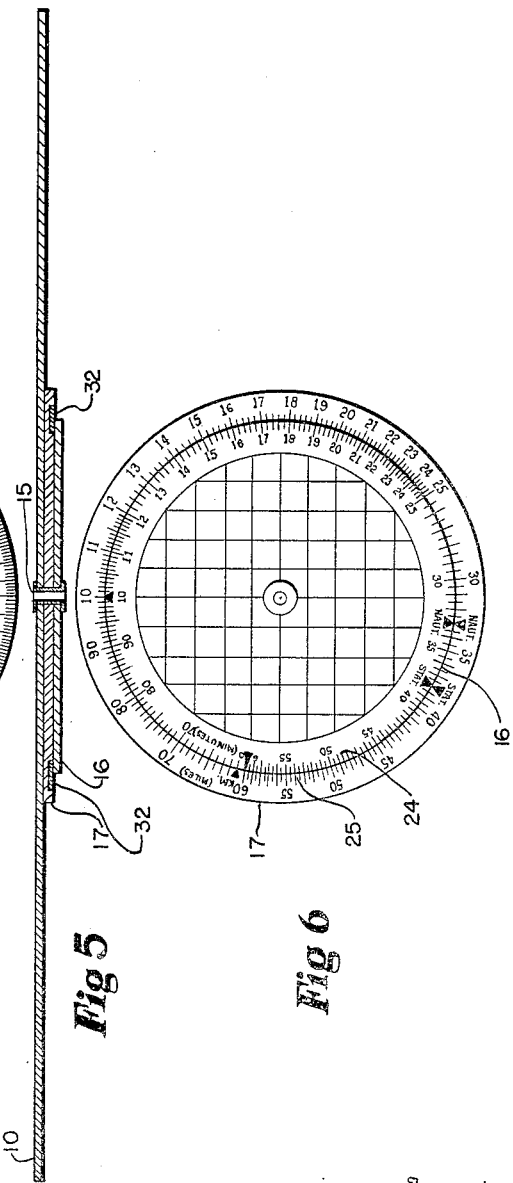
Fig 6
Inventor
L. A. WARNER
By Ben. J. Sheony, Attorney March 20, 1951 — L. A. WARNER — 2,545,935
NAVIGATIONAL INSTRUMENT
Filed Aug. 19, 1947 — 4 Sheets-Sheet 3
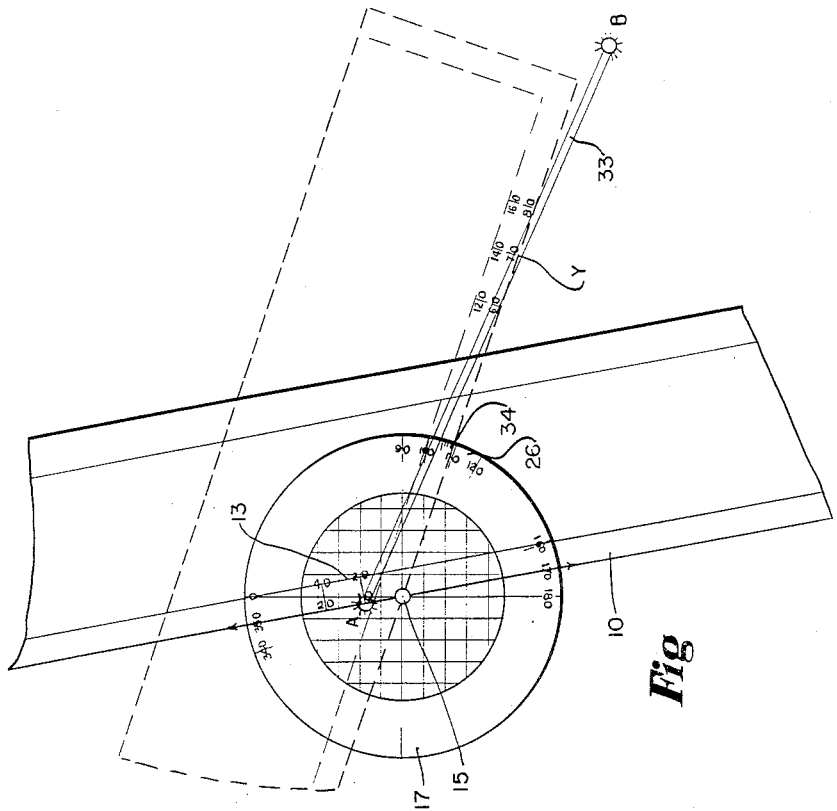
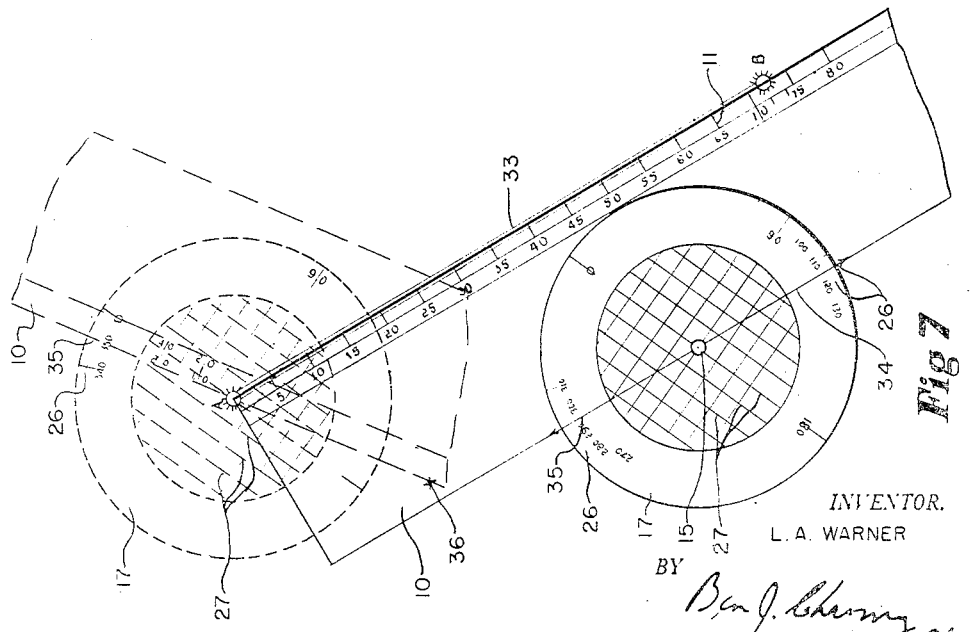
INVENTOR.
L. A. WARNER March 20, 1951 L. A. WARNER 2,545,935
NAVIGATIONAL INSTRUMENT
Filed Aug. 19, 1947 4 Sheets-Sheet 4
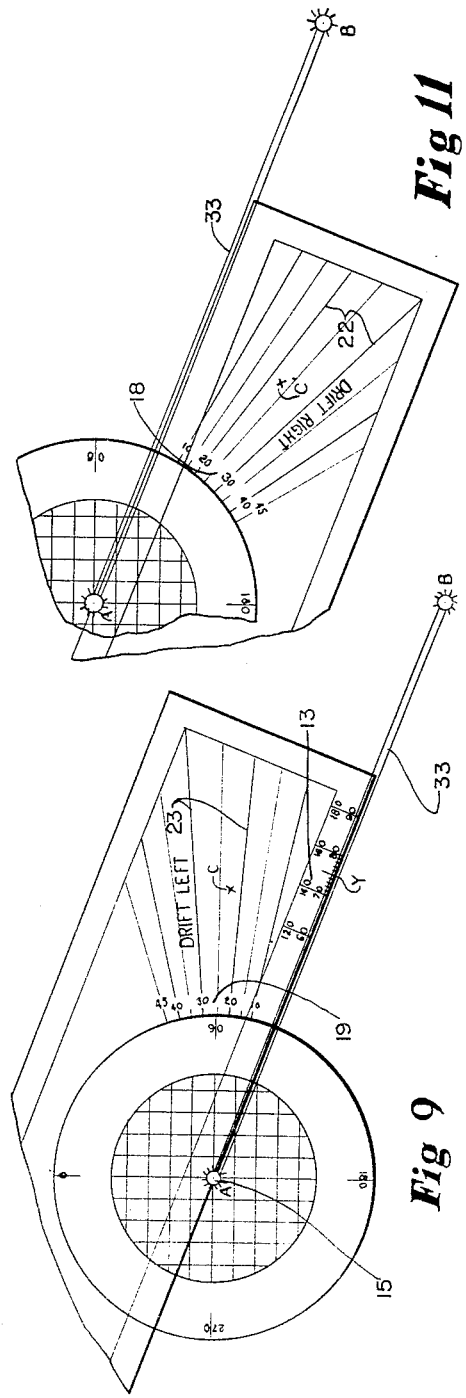
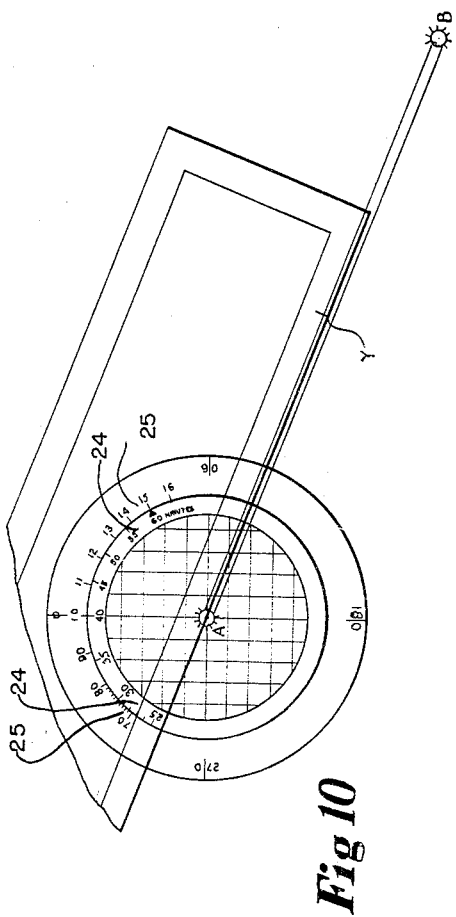
INVENTOR.
L. A. WARNER Patented Mar. 20, 1951

2,545,935

UNITED STATES PATENT OFFICE 2,545,935

NAVIGATIONAL INSTRUMENT

Louis Allen Warner, Chicago, Ill.

Application August 19, 1947, Serial No. 769,399

9 Claims. (Cl. 235—61)

This invention relates to navigational instruments in general. More particularly this invention relates to a navigational instrument on which direction and distance measurements, conversions, wind vector solutions and computations may be performed without the necessity of using supplementary devices or computations.

An object of this invention is to provide a navigational instrument for drawing course lines, measuring distances and directions on aeronautical charts.

Another object of this invention is to provide a device for mechanically correcting magnetic variation and deviation errors so that magnetic and compass directions may be obtained from true direction values.

A further object of this invention is to provide a device for mechanically solving wind vector problems without the necessity for mathematical computations.

Still another object of this invention is to provide a device for solving time-speed-distance problems, fuel consumption problems and for making distance conversions without the necessity for mathematical computations.

Still another object of this invention is to provide a device for plotting true or magnetic bearings, visual or radio, from a station or dead reckoning position.

Another object of this invention is to provide a device for orienting a protractor to true, magnetic or compass directions.

Still another object of this invention is to provide a device for determining drift angles of an aircraft directly from check point information.

An important object of this invention is to provide a device on which the direction and distance measurements, conversions, wind vector solutions and computations encountered on an aircraft or other mobile vessel may be performed directly in one continuous operation without the necessity of using supplementary devices or computations.

Other objects of this invention will be apparent to those skilled in the art to which it relates from the following specification and claims.

Referring to the drawing briefly,

Figure 4 is a plan view of a further modified form of this invention;

Figure 5 is a sectional view along the line 5—5 of Figure 4;

Figure 6 is a bottom view of the circular scales included in the form of this invention shown in Figures 4 and 5, and Figures 7, 8, 9, 10 and 11 are views showing the use of this device in solving navigational problems.

Figure 1:
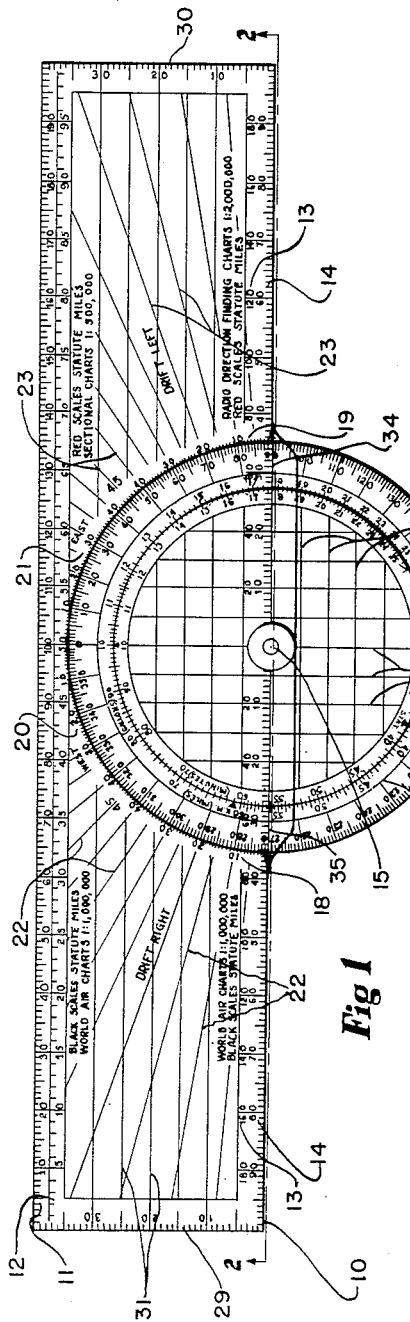
Figure 1 is a plan view of an embodiment of this invention.
Figure 2:
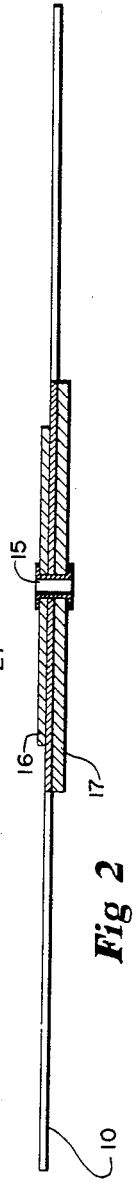
Figure 2 is a sectional view taken along the line 2—2 of Figure 1.

In Figure 1 is shown a navigational device consisting of an elongated substantially rectangular member 10 having a plurality of distance scales positioned around the border thereof. In actual devices, these scales are printed in different color inks so that they may be readily distinguished one from the other. On the top side of the body member 10 are positioned two scales 11 and 12, the scale 11 being in statute miles and having the ratio of 1 to 1,000,000 as used on world air charts and the scale 12 also being in statute miles having a ratio of 1 to 500,000 such as is used on sectional charts. Two scales are also positioned along the bottom edge of the body member 10 and in this case the zero point of each of these scales corresponds to the central or pivotal point 15 at which the circular scale bearing members 16 and 17 are pivoted. The scales 13 and 14 positioned along the bottom edge of the device as shown in Figure 1 have a ratio of 1 to 2,000,000 and 1 to 1,000,000 respectively, so that the scale 13 is the same as that used in radio direction finding charts and the scale 14 is the same as that used in world air charts. Scales 18, 19, 20 and 21 are positioned in a semi-circle in the central portion of the body member 10, with the point 15 as the center thereof. Scale 18 is for the purpose of computing angles of "drift right" and scale 19 is for the purpose of computing the angles of "drift left" as will be described hereinafter. Cooperating with the scales 18 and 19 are angle lines 22 and 23 respectively. Scales 20 and 21 are to be used for deriving magnetic courses directly and may be used in conjunction with values of magnetic variation obtained from the agonic or isogonic lines on the chart of the region over which the craft is being navigated. Scale 20 has its zero point at the point corresponding to 50 on the scale 12 or 100 on the scale 11 and extends to the left from this point along an arc adjacent to the periphery of the circular member 17 for a distance of 45°. This scale is the magnetic west scale and a similar scale 21 extending for an arc of 45° to the right of the above mentioned zero point is the magnetic east scale.

The top circular member 16 is provided with a logarithmic scale 24 around the circumference thereof and this scale cooperates with logarithmic scale 25 positioned on the bottom circular member 17 adjacent to the periphery of the top scale member 16. In order that these two scales may cooperate together the member 10 is made of transparent material such as Celluloid, Vinylite and the like and the scale 25 may therefore be read directly through the body member 10. The circular member 17 is also provided with a 360° scale such as that employed on a compass rose and cooperating with this 360° scale 26 is a square grid consisting of the lines 27 formed parallel to the 0–180° meridian of the compass rose and lines 28 formed perpendicular to the meridian lines 27. This grid is positioned on the central portion of the circular member 17.

Additional scales 29 and 30 having the same ratios as the scales 11 and 14 are positioned along the ends of the member 10. Additional scales having the ratios employed in scales 12 and 13 may also be positioned at the ends of the rectangular member 10, if desired. A plurality of lines 31 parallel to each other and parallel to the long edges of the body member 10 are also positioned on this body member.

Figure 3:
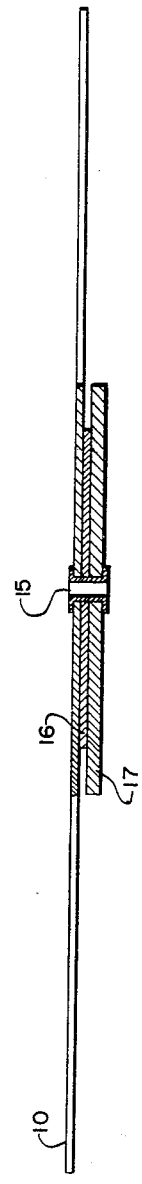
Figure 3 is a sectional view corresponding to the sectional view shown in Figure 2, of a slightly modified form of this invention.

In Figure 3 a modified arrangement of the circular devices 16 and 17 is illustrated and in this form of the invention the smaller disc 16 instead of being positioned on top of the body member 10 is positioned between this body member 10 and the disc 17, and in other respects the arrangement of this device is the same as that shown in Figure 1.

The form of this invention shown in Figures 4, 5 and 6 also employs the body member 10 and the two rotatable discs 16 and 17. However, in this case the disc 16 is positioned below the disc 17 and the scales 24 and 25 carried by the discs 16 and 17 respectively are visible only from the bottom of the device as shown in Figure 6. Consequently only one scale, namely, scale 26 appears on the top of the disc 17 and less confusion is likely to result from the use of this form of the invention. In order to make the scales 24 and 25 visible only from the bottom an opaque coating 32 of material such as white paint or enamel is provided to the disc 17 and extends completely around the disc on an area substantially coextensive with that occupied by the scales 24 and 25, the scale 25 being printed on this opaque coating.

The use of this invention in solving navigational problems and making computations of value to the navigator will now be explained in connection with Figures 7, 8, 9, 10 and 11 in which it will be assumed that it is desired to navigate a craft between the points A, B which are positioned on a map or navigational chart. The body member 10 is placed so that the top straight edge thereof extends between the points A, B and a course line 33 is drawn between these two points. At the same time the distance between the points A and B is measured on the scale 12 showing this distance to be 72 miles and the circular member 17 is rotated so that one of the grid lines 27 is parallel to a meridian on the map or chart. The angle of the course 33 with respect to the meridian is now read from the scale 26 at the point where this scale is crossed by the line 34 on the body member 10 and this angle is found to be 115° in this particular problem. Likewise the course from B to A may be read from the scale 26 where this scale is intersected by the line 35. To solve the wind problem, it is assumed that a 20 mile per hour wind is blowing from the point on the compass designated by 350°. The pivotal point 15 of the device is positioned over the starting point A on the chart. The device will now appear as shown in fragmentary outline by broken lines in Figure 7 with the pivotal point 15 over the starting point A and meridian grid lines 27 of the disc 17 parallel to the meridians of the chart. The body portion of the device 10 is rotated while the disc 17 is held stationary, until the line 35 intersects the scale 26 at 350°, this line 35 now coincides with the wind vector. Now by holding a pencil point at the point 36 on the chart against the edge of the body member 10 the whole device is slid downward a distance of 20 units on the scale 13 so that the starting point A is over the 20 unit position on the scale 13 as shown in Figure 8 and the pivotal point 15 of the device is downwind from the starting point A a distance of 20 units. The disc 17 is held in this position on the chart and the body of the device is swung around as shown in dotted outline in Figure 8 until the bottom edge of this body intersects with the course line 33. The point at which this bottom edge intersects with the course line 33 is determined by the air speed of the craft and in this case it was assumed that the air speed of the craft is 140 miles per hour so that the bottom edge of the device should be rotated to intersect with the course line 33 at the figure 140 on the scale 13. The true heading of the craft may now be read from the scale 26 where this scale is intersected by the line 34 and it will be observed that this true heading is about 108°.

In order to obtain ground speed of the craft the point of a pencil is held over the point Y on the chart as obtained from Figure 8 where the bottom edge of the device is intersected with the course line, and the device is moved so that the pivotal point 15 coincides with the starting point A. The ground speed may now be read from the scale 13 at the point where this scale coincides with the point Y and it will be found that this speed is 150 miles per hour as shown in Fig. 9. The distance of flight as determined from Figure 7 and the ground speed as determined from Figure 9 are now set up on the scales 24 and 25, taking the number 15 on the scale 25 to correspond to 150 miles per hour and the number 60 on the scale 24 to correspond to 60 minutes and rotating the disc 16 so that these numbers are opposite to each other, the required time of flight is read off of the scale 24 opposite the number 72 on the scale 25. This required time of arrival is found to be 28.5 minutes as shown in Figure 10. The estimated time of arrival is determined by adding the required time of flight to the time of departure.

In order to check if any drift has set in and the angle of such drift a check point C corresponding to some marked object on the chart is spotted from the craft and it is found that the craft is substantially over this object indicating that the craft has drifted from its course. The angle of this drift is determined as shown in Figure 9 by placing the device with its long edge extending from the pivotal point 15 over the course line 33 and it is found that the point C appears between the drift lines 23 corresponding to the 20° and 30° angles. It is therefore estimated that the craft has drifted about 22° to the left of the course. If the point C spotted from the craft had instead been C' as shown in Figure 11, it is obvious that the craft would have drifted to the right of the course and this angle could be determined by swinging the body of the plotter with respect to the point A until the 'drift right" lines 22 encompass the point C' and the long edge of the body were coincident with the course line 33 as shown in Figure 11. The drift in this case is estimated at 22° to the right using the lines 22 and the associated scale 18.

It will be observed that from the foregoing description that I have described preferred embodiments of my invention in detail. However, I do not desire to limit this invention to those exact details except in so far as they may be defined by the following claims.

What is claimed is:

1. A navigational instrument for measuring distances, directions and drift, comprising an elongated substantially rectangular transparent member adapted to be laid on a navigation chart so that the check-point on the chart may be seen therethrough, said transparent member having a length equal to several times its width, a plurality of distance measuring scales along the edges of said substantially rectangular member, a graduated substantially circular transparent compass card having a radius smaller than the width of said substantially rectangular elongated member, a pivot for said compass card substantially in the center of one of the long edges of said elongated member, a set of "drift left" angle lines on said rectangular transparent member extending at angles determined with respect to said long edge passing substantially through said pivot point, said set of "drift left" angle lines being on one side of said compass card and a corresponding set of "drift right" angle lines on the other side of said compass card, said "drift left" and "drift right" angle lines being adapted to be used with check-points on the aforesaid navigation chart.

2. A navigational instrument for measuring distances, directions and drift angles on charts, comprising an elongated substantially rectangular transparent member adapted to be laid on a navigation chart so that the check-point on the chart may be seen therethrough, said transparent member having a length equal to several times its width, a plurality of distance measuring scales along the edges of said substantially rectangular member, a graduated substantially circular transparent compass card having a radius smaller than the width of said substantially rectangular elongated member, a pivot for said compass card substantially in the center of one of the long edges of said elongated member, a square grid in the central portion of said compass card, a set of "drift left" angle lines on said rectangular transparent member extending at angles determined with respect to said long edge passing substantially through said pivot point, said set of "drift left" angle lines being on one side of said compass card and a corresponding set of "drift right" angle lines on the other side of said compass card, said "drift left" and "drift right" angle lines being adapted to be used with check-points on the aforesaid navigation chart.

3. A navigational instrument comprising an elongated substantially rectangular transparent body member adapted to be laid on a navigation chart so that the check-point on the chart may be seen therethrough, a rotatable device comprising a graduated compass card, means for pivoting said rotatable device substantially in the center of one of the long edges of said body member, a plurality of distance measuring scales on the long edges of said body member, said scales on one of said long edges being continuous from one end to the other and on the other of said long edges said scales starting with zero at the pivot point of said rotatable device and increasing in opposite directions from said pivot point, a set of "drift left" angle lines on said body member extending at angles determined with respect to said long edge passing substantially through said pivot point, said set of "drift left" angle lines being on one side of said rotatable device and a corresponding set of "drift right" angle lines on the other side of said rotatable device, said "drift left" and "drift right" angle lines being adapted to be used with check-points on the aforesaid navigation chart.

4. A navigational instrument comprising an elongated substantially rectangular transparent body member adapted to be laid on a navigation chart so that the check-point on the chart may be seen therethrough, a rotatable device comprising a graduated compass card, means for pivoting said rotatable device substantially in the center of one of the long edges of said body member, a plurality of distance measuring scales on the long edges of said body member, said scales on one of said long edges starting with zero at the pivot point of said rotatable device and increasing in opposite directions from said pivot point, a set of "drift left' angle lines on said body member extending at angles determined with respect to said long edge passing substantially through said pivot point, said set of "drift left" angle lines being on one side of said rotatable device and a corresponding set of "drift right" angle lines on the other side of said rotatable device, said "drift left" and "drift right" angle lines being adapted to be used with check-points on the aforesaid navigation chart.

5. A navigational instrument for measuring distances, directions and flight time, comprising an elongated substantially rectangular transparent member adapted to be laid on a navigation chart so that the check-point on the chart may be seen therethrough, said transparent member having a length equal to several times its width, a graduated substantially circular transparent compass card having a radius smaller than the width of said substantially rectangular elongated member, a pivot for said compass card substantially in the center of one of the long edges of said elongated member, a transparent disc concentric with and above said compass card, said transparent disc and said compass card having cooperating logarithmic scales thereon, a plurality of distance measuring scales on the long edges of said rectangular transparent member, said scales on one of said long edges being continuous from one end to the other end and on the other of said long edges said scales starting with zero at the pivot point of said rotatable device and increasing in opposite directions from said pivot point, said distance measuring scales yielding values adapted to be set into one of said logarithmic scales whereby the time of flight may be read from the other of said logarithmic scales.

6. A navigational instrument as set forth in claim 5 further characterized in that a portion of the back of the compass card adjoining the logarithmic scales is substantially opaque.

7. A navigational instrument for measuring distances, directions and flight time, comprising an elongated substantially rectangular transparent member adapted to be laid on a navigation chart so that the check-point on the chart may be seen therethrough, said transparent member having a length equal to several times its width, a plurality of distance scales along the edges of said rectangular member, a graduated substantially circular transparent compass card having a radius smaller than the width of said substantially rectangular elongated member, a pivot for said compass card substantialy in the center of one of the long edges of said elongated member, a disc of smaller radius than said compass card concentric with said compass card, logarithmic scales, one of said logarithmic scales being positioned on the back of said compass card and another of said logarithmic scales being positioned on said disc and cooperating with the other of said logarithmic scales so that navigational problems may be solved when values from said distance scales are set into said logarithmic scales, and a substantially opaque backing on said compass card for said logarithmic scales.

8. An instrument for use in navigating a craft on predetermined courses comprising an elongated substantially rectangular transparent body member adapted to be laid on a navigation chart so that the check-point on the chart may be seen therethrough, a rotatable graduated compass card, a pivot for said compass card substantially in the center of one of the long edges of said body member, a plurality of distance measuring scales on the long edges of said body member, said scales on one of said long edges being continuous from one end to the other and on the other of said long edges said scales starting with zero at said pivot and increasing in opposite directions from said pivot, a set of "drift left" angle lines on said body member extending at angles determined with respect to said long edge passing substantially through said pivot, said set of "drift left" angle lines being on one side of said rotatable compass card and a corresponding set of "drift right" angle lines on the other side of said pivot, whereby the angle of drift with respect to a predetermined course and the correction may be determined so that the craft may be maneuvered to regain the course, said "drift left" and "drift right" angle lines being adapted to be used with check-points on the aforesaid navigation chart.

9. A navigational instrument for measuring distance, directions and for computing flight data, comprising an elongated substantially rectangular transparent member having a length equal to several times its width, a graduated substantially circular transparent compass card having a radius smaller than the width of said substantially rectangular elongated member, a pivot for said compass card substantially in the center of one of the long edges of said elongated member, a transparent disc concentric with said compass card, said transparent disc and said compass card having cooperating logarithmic scales thereon, a plurality of distance measuring scales on the long edges of said body member, said scales on one of said long edges being continuous from one end to the other end and on the other of said long edges said scales starting with zero at the pivot point of said rotatable device and increasing in opposite directions from said pivot point, said distance measuring scales yielding values adapted to be set into one of said logarithmic scales whereby the computation of time and speed of flight may be read from the other of said logarithmic scales, said cooperating logarithmic scales also yielding values adapted to be set onto the distance scales for solving other navigational problems.

LOUIS ALLEN WARNER.

REFERENCES CITED

The following references are of record in the file of this patent:

UNITED STATES PATENTS

| Number | Name | Date |
| --- | --- | --- |
| D. 135,282 | Green | Mar. 23, 1943 |
| 1,985,907 | Weems | Jan. 1, 1935 |
| 2,004,951 | Jensen | June 18, 1935 |
| 2,007,986 | Sprague | July 16, 1935 |
| 2,019,708 | Jones | Nov. 5, 1935 |
| 2,339,222 | Hokanson | Jan. 11, 1944 |
| 2,345,020 | Warner | Mar. 28, 1944 |
| 2,425,097 | Isom | Aug. 5, 1947 |

OTHER REFERENCES

Page 92 of Marine Navigation by P. V. H. Weems, copyright 1940, a book published by D. Van Nostrand Co., 250 Fourth Avenue, New York, N. Y.